United States Patent [19]

Esser

[11] Patent Number: 5,718,461
[45] Date of Patent: Feb. 17, 1998

[54] PIPE BEND

[75] Inventor: Alexander Esser, Warstein, Germany

[73] Assignee: Esser-Werke GmbH & Co. KG, Warstein, Germany

[21] Appl. No.: 587,358

[22] Filed: Jan. 16, 1996

[30]  Foreign Application Priority Data

Jan. 14, 1995 [DE] Germany ............ 195 00 953.3

[51] Int. Cl.⁶ ............................................. F16L 43/00
[52] U.S. Cl. .......................... 285/179; 285/55; 406/193
[58] Field of Search ............................. 285/179, 182, 285/183, 16, 17, 55; 138/105, 155, 171, 177, 36; 406/193

[56]  References Cited

U.S. PATENT DOCUMENTS

| | | | |
|---|---|---|---|
| 1,960,557 | 5/1934 | Snyder | 285/179 |
| 4,606,556 | 8/1986 | Metzger | 285/179 X |
| 4,621,953 | 11/1986 | McGuth | 406/193 |
| 4,653,777 | 3/1987 | Kawatsu | 285/179 X |
| 5,275,440 | 1/1994 | Esser | 285/179 X |

FOREIGN PATENT DOCUMENTS 3814034  11/1989  Germany.

Primary Examiner—Terry Lee Melius
Assistant Examiner—Heather Shackelford
Attorney, Agent, or Firm—Friedrich Kueffner

[57]  ABSTRACT

A pipe bend for a pipeline for hydraulically or pneumatically conveying solids includes a middle pipe portion and double-layer coupling flanges welded to the ends of the middle pipe portion. Each coupling flange has an outer layer and an inner wear ring. Each outer layer includes an annular collar, a coupling groove and a pipe connecting piece. The wear ring has an outer section whose wall thickness is greater than the wall thickness of an inner section of the wear ring, wherein the outer section is located relative to the pipe axis facing away from the center of curvature of the middle pipe portion extending between the coupling flanges and the inner section is located facing the center of curvature. In addition, the greater wall thickness of the outer section of the wear ring corresponds to the wall thickness of the end portions of the middle pipe portion.

7 Claims, 2 Drawing Sheets

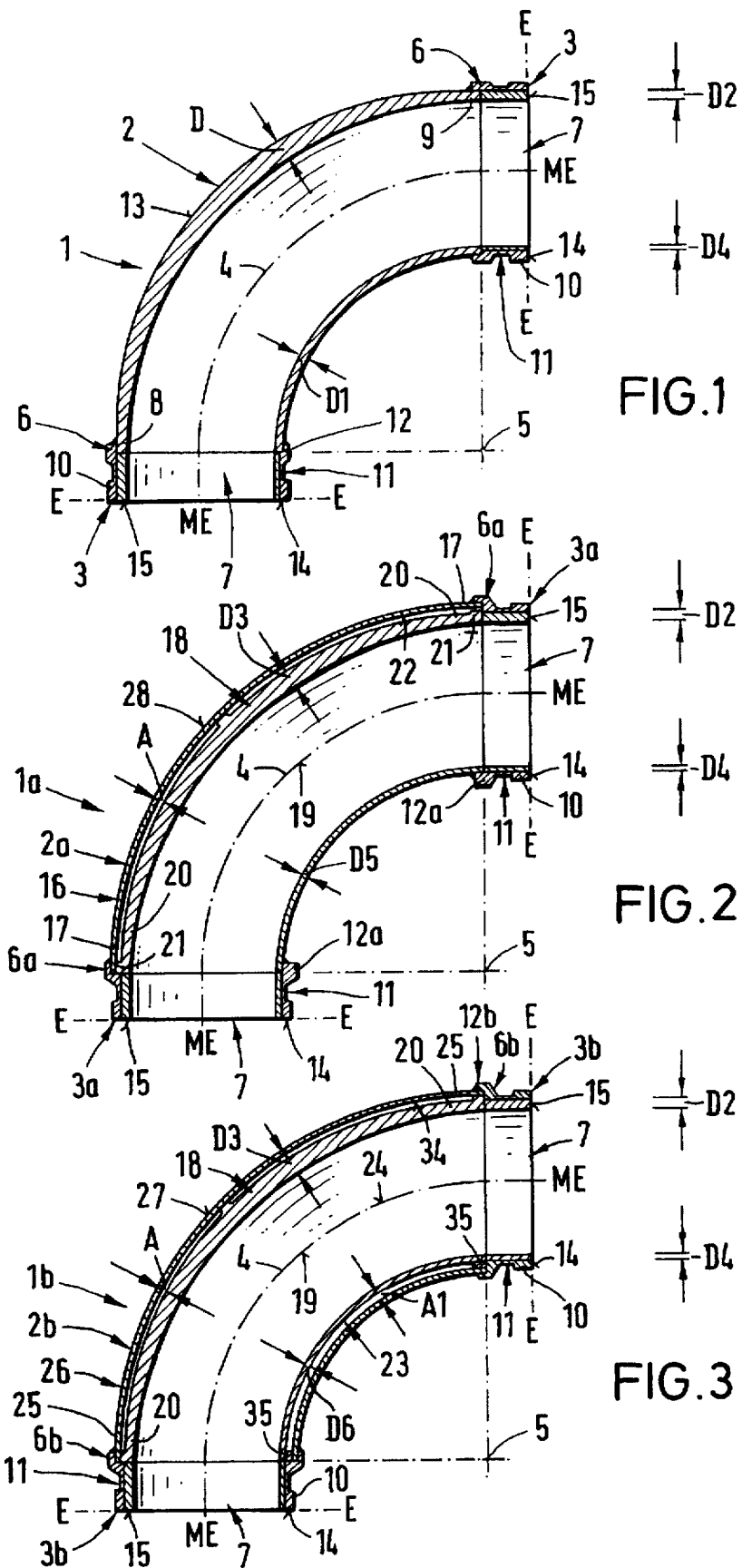

PIPE BEND

BACKGROUND OF THE INVENTION

1. Field of the Invention

The present invention relates to a pipe bend for a pipeline for hydraulically or pneumatically conveying solids. The pipe bend includes a middle pipe portion and double-layer coupling flanges welded to the ends of the middle pipe portion. Each coupling flange has an outer layer and an inner wear ring. Each outer layer includes an annular collar, a coupling groove and a pipe connecting piece.

2. Description of the Related Art

Practical experience has shown that, in the case of a standardized inner cross-sectional conveying area and a predetermined outer configuration and dimension of the coupling flanges, the wear volume of the wear rings integrated into the coupling flanges of pipe bends and particularly the annular collars and coupling grooves of the wearrings, cannot be made sufficiently large for all solids to be conveyed or being conveyed so as to prevent wear experienced at the upstream ends of conveying pipes which are connected to pipe bends. In this connection, where volume is understood to be that volume or quantity of material which may be worn off by the solids being conveyed without rendering inoperative the respective structural components, i.e., the pipe bend or the wear rings. In other words, the wear volume is the quantity of material available for wear. Accordingly, for reasons of safety, after a certain time of use, not only the pipe bends which are subjected to a higher wear were replaced by new pipe bends, but also the straight pipes connected downstream to the pipe bends in conveying direction were also replaced as a precaution more or less frequently. Consequently, for insuring a safe and problem-free conveyance of solids, the expenses were high with respect to the assembly and disassembly of the pipeline as well as with respect to the amount of material required.

SUMMARY OF THE INVENTION

Therefore, it is the primary object of the present invention to propose a pipe which not only provides a greater resistance to the wear resulting from the solids being conveyed so that its service life can be increased, but which additionally eliminates the need for also replacing the pipe which follows the pipe bend in conveying direction earlier than this pipe would have to be replaced under normal conditions.

In accordance with the present invention, the wear ring has an outer section whose wall thickness is greater than the wall thickness of an inner section of the wear ring, wherein the outer section is located relative to the pipe axis facing away from the center of curvature of the middle pipe portion extending between the coupling flanges and the inner section is located facing the center of curvature. In addition, the greater wall thickness of the outer section of the wear ring corresponds to the wall thickness of the end portions of the middle pipe portion.

Since, particularly due to the centrifugal force, the sections facing away from the center of curvature of the pipe bend relative to the pipe axis are subjected most strongly to the frictional wear resulting from the solids being conveyed, the present invention now makes it possible because of the eccentricity of the wear rings to provide not only the sections of the middle pipe portion between the coupling flanges facing away from the center of curvature with an increased wear volume, but also the outer section preferably of the wear ring located at the downstream end of the pipe bend. The increase of the wall thickness of the wear rings in the sections facing away from the center of curvature is at the expense of the wall thickness of the section facing the center of curvature. However, since no significant wear has to be expected in this section, the wall thickness is only required to be dimensioned in such a way that, taking into consideration the standardized conveying cross-section and the corresponding outer dimensions of the coupling flanges standard couplings, i.e., coupling clamps with clamping elements and sealing rings, can be used for connecting the pipe bend to the adjacent pipes.

As explained above, it would basically only be necessary to equip the coupling at the downstream end of a pipe bend with a wear ring which has the increased wall thickness in the outer section facing away from the center of curvature and which is subjected to the greater wear volume. However, in order to avoid an incorrect assembly when a new pipe bend is mounted in the pipeline, which is a job frequently carried out by unskilled labor, coupling flanges with wear rings having eccentric wall thicknesses are preferably mounted at both ends of the pipe bend.

The wear rings may be of a hardened steel or they may be cast wear rings.

In order to increase the service life of the pipe bend at the downstream end thereof and, thus, to increase the service life of the entire pipe bend, a further development of the present invention provides that a high-wear ring is mounted between the wear ring of the coupling flange on the downstream end and the adjacent end of the middle pipe portion. This high-wear ring is preferably not of eccentric construction. This high-wear ring is particularly of a material which has an even higher resistance to wear than Ni-hard IV. Since this material is expensive and can be manufactured only with a certain minimum wall thickness, the high-wear ring has a length which is significantly shorter than that of the wear ring. The high-wear ring essentially produces a barrier in front of the actual wear ring in conveying direction, so that the service life of the wear ring and, thus, the service life of the entire pipe bend is substantially increased.

In accordance with another feature of the present invention, at the coupling flange located downstream in conveying direction, the wear ring is mounted between the adjacent end face of the middle pipe portion and a reinforcing ring arranged upstream of the coupling flange, wherein the reinforcing ring has a shorter axial length than the wear ring. The reinforcing ring preferably is a casting, while the adjacent wear ring is of hardened steel. This reinforcing ring makes it possible to even further increase the service life of the pipe bend. As is the case in the wear ring, the reinforcing ring may have a section facing away from the center of curvature with a greater wall thickness than the section facing the center of curvature, i.e., the reinforcing ring may also be of eccentric construction.

Irrespective of whether coupling flanges are used which are only composed of the outer layers and the inner wear rings, or whether they are coupling flanges with a high-wear ring at the downstream end or a reinforcing ring at the upstream end of a pipe bend, the free end faces of the annular collars for the outer layers facing away from each other always extend in the transverse planes in which the free end faces of the wear rings or the reinforcing rings also extend. Consequently, each pipe bend can be removed without problems by moving it transversely out of the pipeline and a new pipe bend can again be inserted in transverse direction.

Moreover, it is conceivable that the reinforcing ring is releasably mounted in the coupling flange at the upstream end, so that it is sufficient to replace only the reinforcing ring after the reinforcing ring has worn.

The various configurations of the coupling flanges at the upstream and downstream ends described above can be mounted on different middle pipe portions depending on the requirements.

Accordingly, the coupling flanges can be used, for examples, in a single-layer middle pipe portion whose wall thickness is greater in the section facing away from the center of curvature than in the section facing the center of curvature. This particular middle pipe portion is especially a cast piece whose wall thickness in the section facing away from the center of curvature increases toward the middle of the pipe bend starting from the coupling flange at the upstream end and then decreases toward the coupling flange at the downstream end. The outer layers of the coupling flanges engage with the pipe connecting pieces over the ends of the middle pipe section and are welded thereto.

In accordance with another embodiment of the present invention, the middle pipe portion is composed of an outer pipe and a wear shell having a U-shaped cross-section. The wear shell is provided between the coupling flanges in the section facing away from the center of curvature and at a distance from the inner surface of the outer pipe. The end faces of the sides of the wear shell extend in a longitudinal center plane which extends through the pipe axis and perpendicularly to the center of curvature. The outer pipe has a constant wall thickness. The ends of the outer pipe are engaged by the pipe connecting pieces and are welded thereto on the outside.

In the section facing away from the center of curvature relative to the pipe axis, a wear shell having a U-shaped cross section is placed inside of the outer pipe, wherein the wear shell is arranged at a distance from the outer pipe between the coupling flanges. The wall thickness of this wear shell in the section facing away from the center of curvature preferably increases from the upstream coupling flange to approximately the middle and then decreases toward the downstream coupling flange. Projections may be integrally formed with the outer circumference of the wear shell particularly at the ends and in the middle, wherein these projections may rest against the inner surface of the outer pipe. In addition, it is possible in this embodiment that solid particles may penetrate through the gaps between the coupling flanges and the wear shell into the areas between the wear shell and the outer pipe and that these solid particles fill out this area. In this manner, the wear shell is essentially embedded in the solids to be conveyed. This wear shell is preferably a casting.

In accordance with another embodiment, an inner wear shell is provided in the middle pipe portion in addition to the outer pipe shell described above. While the outer wear shell is preferably of a thin cast material, the inner wear shell is preferably of sheet steel. The inner wear shell also extends between the coupling flanges at a distance from the outer pipe, so that solid particles can penetrate into the area between the inner wear shell and the outer pipe and can form a bed for supporting the inner wear shell. The inner wear shell can also be provided with projections protruding from the outer circumference thereof, wherein these projections may rest against the inner surface of the outer pipe.

In accordance with another embodiment of the present invention, the middle pipe portion includes a circumferencially closed inner pipe which over its entire surface is in contact with the outer pipe. This middle pipe portion is manufactured by initially inserting a straight inner pipe of a hardenable steel into an outer pipe of a weldable steel. Subsequently, the pipes are bent into the required curvature and the inner pipe is then hardened. This causes the inner pipe to be in contact over its entire surface with the inner surface of the outer pipe. The coupling flanges are welded to the outer surface of the outer pipe through the pipe connecting pieces at the outer layers of the coupling flanges.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIGS. 1 through 5 are longitudinal sectional views each showing an embodiment of the pipe bend according to the present invention for conveying concrete.

DETAILED DESCRIPTION OF THE PREFERRED EMBODIMENTS

Figure 4:
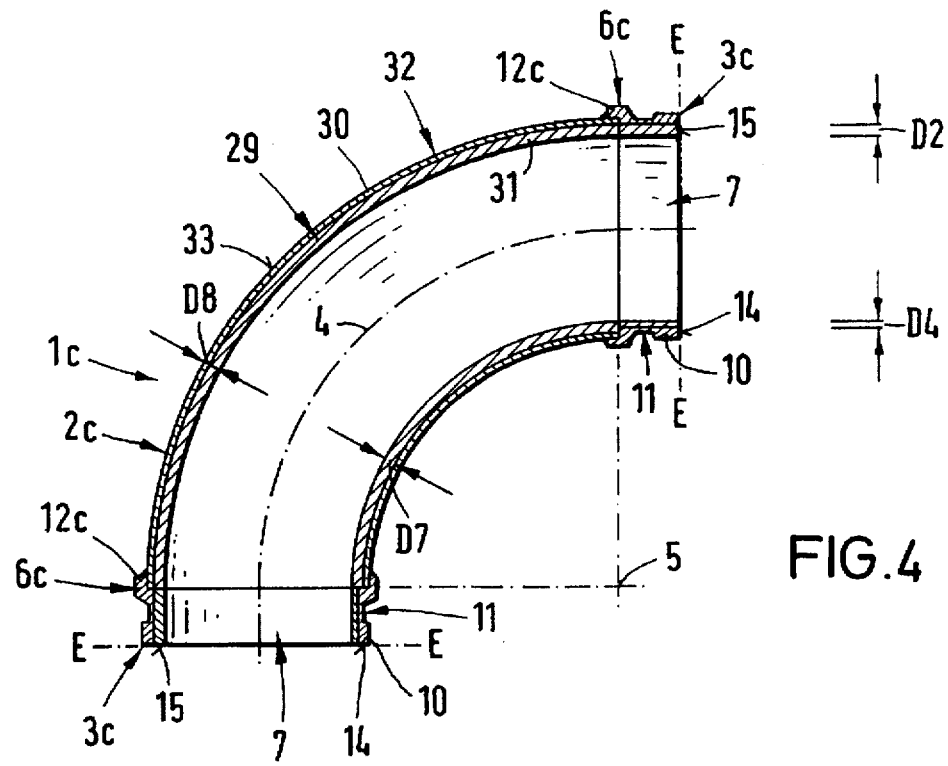

FIG. 1 of the drawing shows a pipe bend 1 for conveying concrete. As is the case for the pipe bends 1a–1d illustrated in FIGS. 2 through 5, the pipe bend 1 is incorporated into a pipeline, not shown, by means of coupling clamps, clamping means and sealing rings, also not shown. For example, the pipeline may be a component of a truck-mounted concrete pump.

The pipe bend 1 is composed of a middle pipe portion 2 and two identically constructed coupling flanges 3 at the ends of the middle pipe portion 2.

The middle pipe portion 2 is cast and, in the section facing away from the center of curvature 5 relative to the pipe axis 4, has a greater wall thickness D over the entire length thereof than in the section facing the center of curvature 5 in relation to the pipe axis 4. While the wall thickness D increases between the coupling flanges 3 from the coupling flanges 3 toward the middle of the pipe bend 1, the wall thickness D1 in the section facing the center of curvature 5 remains constant over the entire length thereof.

The coupling flanges 3 are each composed of an outer layer 6 and an inner wear ring 7. In the section facing away from the center of curvature 5 in relation to the pipe axis 4, the wear ring 7 has a greater wall thickness D2 than in the section facing the curvature 5. It is apparent that the greater wall thickness D2 of the wear rings corresponds to the wall thickness D of the middle pipe portion 2 in the end portions 8, 9 facing the wear rings 7. Each outer layer 6 includes an annular collar 10, a coupling groove 11 and a connecting pipe piece 12. The connecting pipe pieces 12 engage over the end portions 8, 9 of the middle pipe portions 2 and are welded to the outer surface 13 of the middle pipe portion 2.

The free end faces 14, 15 of the annular collars 10 and wear rings 7 facing away from each other extend in the same transverse planes E—E.

The wall thickness D4 of the wear rings 7 in the section facing the center of curvature 5 is smaller than the constant wall thickness D1 of the middle pipe portion 2 in the adjacent end portions 8, 9.

The pipe bend 1a illustrated in FIG. 2 is composed of a middle pipe portion 2a and of two identically constructed coupling flanges 3a at the ends of the pipe portion 2a.

The middle pipe portion 2a includes an outer pipe 16 of weldable steel which is welded to the coupling flanges 3a. For this purpose, the pipe connecting pieces 12a of the outer layers 6a of the coupling flanges 3a engage over the ends 17 of the outer pipe 16.

In the section facing away from the center of curvature 5 in relation to the pipe axis 4, a wear shell 18 of cast material having a U-shaped cross-section is placed in the outer pipe 16 at a distance A from the outer pipe 16. The wear shell 18 is clamped between the coupling flanges 3a. The end faces 19 of the sides of the wear shell 18 extend in the longitudinal center plane ME—ME extending through the pipe axis 4 and perpendicularly to the center of curvature 5.

The wall thickness D3 of the wear shell 18 in the section facing away from the center of curvature 5 corresponds at the ends 20 approximately to the wall thickness D2 of the eccentric wear rings 7 of the coupling flanges 3a, while they are greater in the middle portion. Projections 21 at the ends 20 and in the middle portion, integrally formed with the wear shell 18, may rest against the inner surface 22 of the outer pipe 16. The end faces 14, 15 of the annular collars 10 and of the wear rings 7 each extend in the same transverse planes E—E.

The wall thicknesses D2, D4 of the wear rings 7 in the coupling flanges 3a are dimensioned in such a way that in the section facing the center of curvature 5, they are equal to the constant wall thickness D5 of the outer pipe 16, while, in the section facing away from the center of curvature 5, they approximately correspond to the wall thickness D3 at the ends 20 of the wear shell 18.

With respect to the outer layers 6a, the coupling flanges 3a include coupling grooves 11 in addition to the pipe connecting pieces 12a and the annular collars 10. The pipe connecting pieces 12a are welded to the outer surface 28 of the outer pipe 16.

In addition to an outer wear shell 18 as seen in the pipe bend 1a of FIG. 2, the pipe bend 1b of FIG. 3 has an inner wear shell 23 of steel. This inner wear shell 23 has a U-shaped cross-section wherein the end faces 24 of the sides of the wear shell 23 also extend in the longitudinal center plane ME—ME extending through the pipe axis 4 and perpendicularly to the center of curvature 5. The wall thickness D6 of the inner wear shell 23 is always smaller than the smallest wall thickness D3 of the outer wear shell 18.

The coupling flanges 3b extend with the pipe connecting pieces 12b for the outer layers 6b over the ends 25 of an outer pipe 26 and are welded to the outer surface 27 thereof. The inner wear shell 23 and the outer wear shell 18 extend at a distance A, A1, respectively, from the outer pipe 26, wherein solids can penetrate during operation into the areas between the wear shells 18, 23 and the outer pipe 26, so that these solids form a support for the wear shells 18, 23.

The wear rings 7 of the coupling flanges 3b attached to the ends of the middle pipe portion are of eccentric construction, wherein the wall thickness D2 in the section facing away from the center of curvature 5 corresponds to the wall thickness D3 of the outer wear shell 18 at the adjacent ends 20, while the wall thickness D4 in the sections facing the center of curvature 5 corresponds to the wall thickness D6 of the inner wear shell 23.

The outer layers 6b of the coupling flanges 3b also have annular collars 10 and coupling grooves 11 in addition to the pipe connecting pieces 12b. The end faces 14, 15 of the annular collars 10 and the wear rings 7 extend in the same transverse plane E—E.

FIG. 4 shows a pipe bend 1c in which a hardened inner pipe 29 rests completely with its outer surface 30 against the inner surface 31 of an outer pipe 32 of weldable steel. The inner pipe 29 has a constant wall thickness D7. However, the wall thickness D7 is greater than the wall thickness D8 of the outer pipe 32.

The pipe connecting piece 12c of identically constructed coupling flanges 3c engage over the outer pipe 32. The pipe connecting pieces 12c are welded to the outer surface 33 of the outer pipe 32.

The wear rings of the coupling flanges 3c are of eccentric construction. In other words, the wall thickness D2 in the section facing away from the center of curvature 5 is greater than the wall thickness D4 in the section facing the center of curvature 5. It is apparent that the wall thickness D2 in the section facing away from the center of curvature 5 corresponds to the wall thickness D7 of the inner pipe 29, while the wall thickness D4 in the section facing the center of curvature 5 is smaller than the wall thickness of the inner pipe 29.

The outer layers 6c of the coupling flanges 3c are composed of annular collars 10 and coupling grooves 11 in addition to the pipe connecting piece 12c. The end faces 14, 15 of the annular collars 10 and of the wear rings 7 each extend in the same transverse plane E—E.

Figure 5:
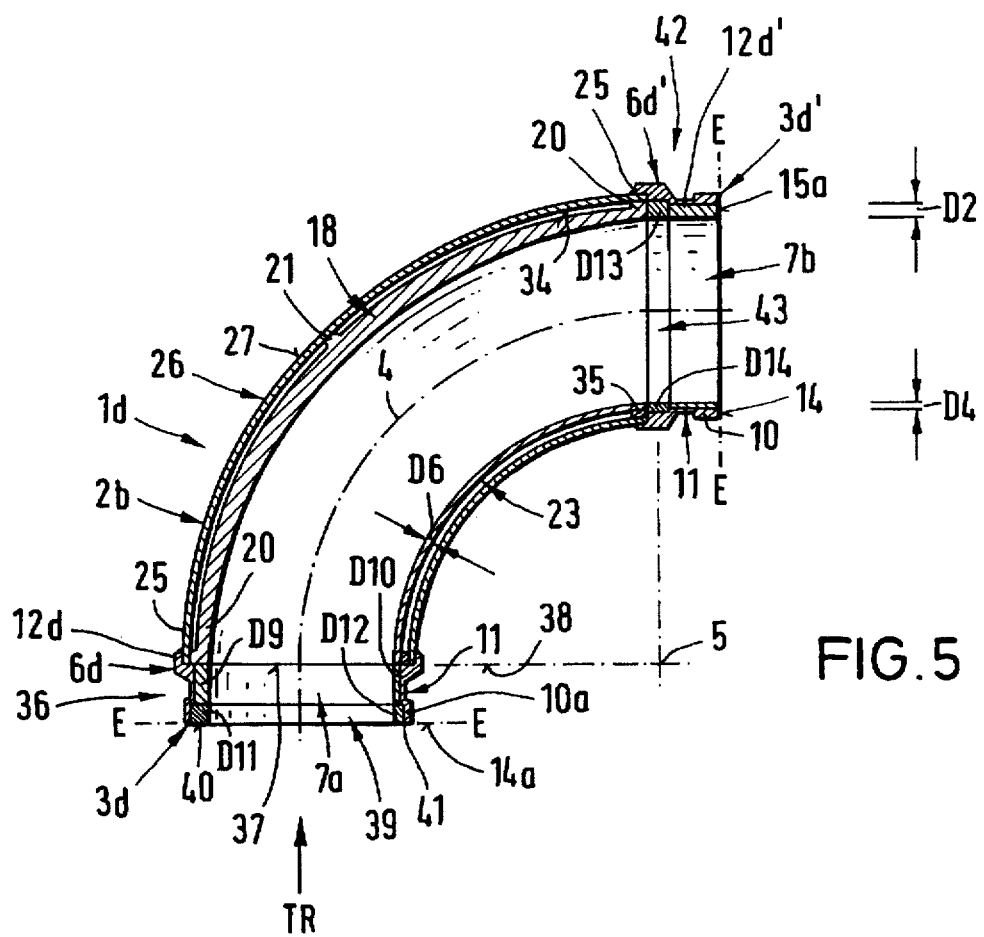

The embodiment of the pipe bend 1d illustrated in FIG. 5 corresponds to the embodiment of the pipe bend 1b of the FIG. 3 with respect to the middle pipe portion 2b. Thus, an outer wear shell 18 of cast material and an inner wear shell 23 of steel are placed in an outer pipe 26 of weldable steel at a distance A, A1, respectively, from the inner surface 34 of the outer pipe 26. Projections 21, 35 at the wear shells may rest against the inner surface 34 of the outer pipe 26.

The coupling flanges 3d, 3d' of the pipe bend 1d are constructed differently. At the upstream end 36 of the pipe bend 1d in conveying direction TR, a pipe connecting piece 12d of the outer layer 6d engages over the adjacent end 25 of the outer pipe 26. The pipe connecting piece 12d is welded to the outer surface 27 of the outer pipe 26. The outer layer 6d includes an eccentric wear ring 7a whose wall thickness D9 in the section facing away from the center of curvature 5 is greater than the wall thickness D10 in the section facing the center of curvature 5. The outer wall thickness D9 corresponds approximately to the wall thickness D3 in the adjacent end portion 20 of the outer wear shell 18, while the wall thickness D10 in the section facing the center of curvature 5 corresponds approximately to the wall thickness D6 of the inner wear shell 23.

It is also clearly shown that, while the wear ring 7a rests against the end faces 37, 38 of the outer end of the inner wear shells 18, 23, respectively, it does not extend up to the transverse plane E—E in which the end face 14a of the annular collar 10a of the coupling flange 3d extends. Rather, the annular collar 10a includes a reinforcing ring 39 of a material which is more resistant to wear. The reinforcing ring 39 may be of cast material. The reinforcing ring 39 has a shorter axial length than the wear ring 7a. The end face 40 of the reinforcing ring 39 extends in the transverse plane E—E. The reinforcing ring 39 is embedded in a filler compound 41 and is of eccentric construction. In the section facing away from the center of curvature 5, the reinforcing ring 39 has a greater wall thickness D11 than in the section facing the center of curvature 5. However, the wall thicknesses D11 and D12 are greater than the wall thicknesses D9 and D10 of the wear rings 7a.

At the downstream end 42 of the pipe bend 1d in conveying direction TR, the pipe connecting piece 12d of the outer layer 6d' of the coupling flange 3d' engages over the adjacent end 25 of the outer pipe 26 and is welded to the outer surface 27 of the outer pipe 26. In this embodiment, the end faces 14, 15a of the annular collar of the outer layer 6d' and the inner wear ring 7b extend in the same transverse plane E—E. The wear ring 7b is of eccentric configuration, wherein, also in this case, the wall thickness D2 in the section facing away from the center of curvature 5 is greater than in the section facing the center of curvature 5. The wall thickness D4 corresponds approximately to the wall thickness D6 of the inner wear shell 23.

A high-wear ring 43 is provided between the wear ring 7b and the adjacent ends 20, 25 of the wear shells 18, 23. The high-wear ring 43 is of a material which has a higher resistance to wear than Ni-hard IV. This high-wear ring 43 is shorter than the wear ring 7b and may also be of eccentric configuration, wherein the greater wall thickness D13 is in the section facing away from the center of curvature 5. The wall thickness D14 in the section facing the center of curvature 5 is greater than the wall thickness D4 of the wear ring 7b or the wall thickness D6 of the wear shell 23.

While specific embodiments of the invention have been shown and described in detail to illustrate the inventive principles, it will be understood that the invention may be embodied otherwise without departing from such principles.

I claim:

1. A pipe bend for a pipeline for hydraulically or pneumatically conveying solids, the pipe bend comprising a curved middle pipe portion, the middle pipe portion having upstream and downstream end portions, the end portions having a wall thickness, the middle pipe portion having a pipe axis and a center of curvature, the pipe bend further comprising double-layer coupling flanges welded to the end portions, each coupling flange comprising an outer layer and an inner wear ring, each outer layer comprising an annular collar, a coupling groove and a pipe-connecting piece, each wear ring having an outer section located relative to the pipe axis remote from the center of curvature of the middle pipe portion and an inner pipe section located closer to the center of curvature than the pipe axis, the outer section and the inner section each having a wall thickness, wherein the wall thickness of the outer section is greater than the wall thickness of the inner section, and wherein the greater wall thickness of the outer section of the wear ring is equal to the wall thickness of the end portions of the middle pipe portion.

2. The pipe bend according to claim 1, further comprising a high-wear ring mounted between the downstream end portion of the middle pipe portion and the wear ring of the coupling flange connected to the downstream end portion, the high-wear ring being surrounded by the outer layer of the coupling flange connected to the downstream end portionand and having an axial length shorter than an axial length of the wear ring, the high-wear ring being of a material having a resistance to wear greater than Ni-hard IV.

3. The wear ring according to claim 1, further comprising a reinforcing ring mounted upstream of the coupling flange connected to the upstream end portion, such that the wear ring of the coupling flange connected to the upstream end portion is mounted between the upstream end portion and the reinforcing ring, wherein the reinforcing ring has a shorter axial length than the wear ring.

4. The pipe bend according to claim 1, wherein the middle pipe portion has an outer section located relative to the pipe axis remote from the center of curvature and an inner section located closer to the center of curvature than the pipe axis, the inner and outer sections of the middle pipe portion each having a wall thickness, wherein the wall thickness of the outer section of the middle pipe portion is greater than the wall thickness of the inner section of the middle pipe portion.

5. The pipe bend according to claim 1, wherein the middle pipe portion comprises an outer pipe and a wear shell having a U-shaped cross-section, the outer pipe having an inner surface, the wear shell being mounted at a distance from the inner surface of the outer pipe relative to the pipe axis remote from the center of curvature, the wear shell extending between the coupling flanges, the wear shell having sides with end faces, wherein the end faces of the sides of the wear shell extend in a longitudinal center plane extending through the pipe axis and perpendicularly to the center of curvature.

6. The pipe bend according to claim 1, wherein the middle pipe portion comprises an outer pipe, an outer wear shell having a U-shaped cross-section and mounted in the outer pipe relative to the pipe axis remote from the center of curvature and an inner wear shell having a U-shaped cross-section located closer to the center of curvature than the pipe axis, wherein the inner wear shell has a smaller wall thickness than the outer wear shell, the wear shells being mounted at a distance from an inner surface of the outer pipe, the wear shells having sides with end faces, the end faces of the sides extending in a longitudinal center plane extending through the pipe axis and perpendicularly to the center of curvature.

7. The pipe bend according to claim 1, wherein the middle pipe portion comprises an outer pipe and a circumferentially closed inner pipe is in contact with an inner surface of the outer pipe by hardening after jointly bending the inner pipe and the outer pipe.

* * * * *